(12) United States Patent
Rupalla et al.

(10) Patent No.: US 7,265,653 B2
(45) Date of Patent: Sep. 4, 2007

(54) METHOD OF PROVIDING A PROTECTIVE COMPONENT WITH AN ADJUSTED TIME CHARACTERISTIC OF THE THERMAL TRANSFER FROM A HEATING ELEMENT TO A FUSIBLE ELEMENT

(75) Inventors: Manfred Rupalla, Witten (DE); Stephan Hell, Dulsburg (DE); Andreas Baus, Dortmund (DE)

(73) Assignee: Wickmann-Werke GmbH, Witten (DE)

( * ) Notice: Subject to any disclaimer, the term of this patent is extended or adjusted under 35 U.S.C. 154(b) by 210 days.

(21) Appl. No.: 10/488,072

(22) PCT Filed: Aug. 16, 2002

(86) PCT No.: PCT/EP02/09154

§ 371 (c)(1),
(2), (4) Date: Sep. 10, 2004

(87) PCT Pub. No.: WO03/021618

PCT Pub. Date: Mar. 13, 2003

(65) Prior Publication Data

US 2005/0062577 A1    Mar. 24, 2005

(30) Foreign Application Priority Data

Aug. 30, 2001   (DE) ............................... 101 42 091

(51) Int. Cl.
*H01H 85/055*   (2006.01)
*H01H 85/05*    (2006.01)

(52) U.S. Cl. ..................... 337/185; 337/182; 337/183; 29/623

(58) Field of Classification Search ............... 337/159, 337/182–185; 29/623
See application file for complete search history.

(56) References Cited

U.S. PATENT DOCUMENTS 3,763,454 A * 10/1973 Zandonatti ................. 337/404

(Continued)

FOREIGN PATENT DOCUMENTS

GB        2205455 A  * 12/1988

(Continued)

*Primary Examiner*—Anatoly Vortman
(74) *Attorney, Agent, or Firm*—Bell, Boyd & Lloyd, LLP

(57) ABSTRACT

The invention relates to a method for producing a protective component, for example a fuse component or a fusing resistor, including a fusible element and a heating element, which are attached as stacking components to the surface of a substrate. The fusible element is configured in such a way that a current flow between its connections is interrupted, if the fusible component is heated, at least in one fusible region, for a predetermined time period to above a predetermined temperature. The fusible element and the heating element are arranged on the substrate in such a way, that heat created by the heating element is transported to the fusible element and the current flow through the heating element exceeds a threshold value for a predetermined time period. During production, the heating element is positioned next to the fusible element, at a predetermined distance from it. A predetermined, local thermal capacitance is set, at least approximately, at the location of the heating element and is coupled to the latter. Alternatively, a predetermined, local thermal capacitance is set at least at one predetermined location between the heating element and the fusible element. The capacitance accumulates part of the heat that is dissipated from the heating element to the fusible element. This produces, at least approximately, a defined time response of the thermal transmission from the heating element to the fusible element.

15 Claims, 2 Drawing Sheets

U.S. PATENT DOCUMENTS 5,097,247 A * 3/1992 Doerrwaechter ............ 337/405
5,652,562 A * 7/1997 Riley ........................ 337/405
5,748,067 A * 5/1998 Ishii et al. .................. 337/160
6,269,745 B1 * 8/2001 Cieplik et al. ........... 102/202.5
6,445,563 B1 * 9/2002 Endo ......................... 361/250
6,452,475 B1 * 9/2002 Kawazu et al. ............. 337/290

FOREIGN PATENT DOCUMENTS

JP            06077016 A * 3/1994  .................. 29/612

* cited by examiner

METHOD OF PROVIDING A PROTECTIVE COMPONENT WITH AN ADJUSTED TIME CHARACTERISTIC OF THE THERMAL TRANSFER FROM A HEATING ELEMENT TO A FUSIBLE ELEMENT

FIELD OF INVENTION

The invention relates to a method of providing a protective component with a fusible element and a heating element, which is applied in the form of layer components to the surface of a substrate, the fusible element being so constructed that the flow of current between its connections is interrupted if the fusible element is heated, at least in a melting region, for a predetermined period of time above a predetermined temperature, the fusible element and the heating element being so arranged on the substrate that heat produced by the heating element is transported to the fusible element and the current flow through the fusible element is interrupted when the current flow through the heating element exceeds a threshold value for a predetermined period of time.

BACKGROUND OF INVENTION

A protective component of the type referred to is disclosed in, for instance, the publication EP 0 715 328 B1. Applied to the surface of a substrate, which consists, for instance, of aluminium oxide, (using thin film or thick film technology) there is an electrically conductive resistive layer which is structured in the form of a rectangular resistor and is provided on two opposite sides with electrical contacts by the application of conductive metal layers. If the electrical resistor R which is manufactured in this manner, has a current I of a predetermined magnitude applied to it, the power loss $P=I^2 \times R$ is converted into heat at the location of the resistive or heating element. An electrically insulating layer is applied over the resistive layer and a fusible element arranged between two supply contacts is produced over the electrically insulating layer.

The fusible element consists of a conductive layer of a low melting point metal, structured in the form of a strip, whereby the layer strip is contacted at its ends with the aid of metallic conducting layers. The strip of the low melting point metal layer is arranged above the heating element so that the heat produced by the heating element is transported to the fusible element, whereby the low melting point metal melts when the temperature of the fusible element exceeds a predetermined threshold value.

For structural reasons, only a portion of the heat produced by the heating resistor is transported to the fusible element; a considerable portion of the heat produced is dissipated into the substrate and to the surroundings of the device. Both the heat dissipated to the substrate and also the heat transmitted through the electrically insulating intermediate layer to the fusible element is transported to a very large extent by thermal conduction, whereby the materials, which conduct the heat, heat up and can store a certain amount of heat. As a result of the small spatial distance of the fusible element from the heating element in the known arrangement, the heat is transported relatively rapidly by thermal conduction, whereby time delays as a result of the storage of heat is not considered in detail with the known device.

It is further known in the prior art to manufacture protective elements, particularly fuse elements, which interrupt the flow of current at predetermined currents and after predetermined times. With very high currents, the interruption should occur within the shortest possible time (quick action). In the case of fuse elements, in which the heating element and the fusible element are connected in series, the current flow is preferably interrupted by destruction of the resistive layer of the heating element. If the fuse element is subjected for a relatively long period of time to a current and this current increases only slowly, the fuse element is broken by melting and rupture of the fusible element when the current exceeds a predetermined threshold value. This minimal current, which ruptures the component only after it has been applied for a relatively long period of time, corresponds to the threshold current of the fuse element. In the case of currents through the fuse element, which have a magnitude above the threshold current of up to a few multiples of the threshold current but which flow for only a relatively short period of time, the fuse component is tripped after predetermined periods of time by rupturing of the fusible element. Such fuse components are commonly characterised by a time-current characteristic, which determines for the component after what periods of time and at what currents (suddenly applied) rupture of the component occurs.

It is the object of the invention to provide a method of producing a protective component, in which the time-current characteristic can be set to be better, particularly in the region above the threshold current up to a few multiples of the threshold current.

SUMMARY OF INVENTION

According to the invention there is provided a method of providing a protective component comprising a fusible element having terminals, and a heating element, which are applied in the form of layer components to the surface of a substrate, said fusible element being configured so that a current flow between its terminals is interrupted if the fusible element is heated, at least in a melting region, for a predetermined period of time above a predetermined temperature, said fusible element and said heating element being so arranged on the substrate that heat produced by said heating element is transported to said fusible element and a current flow through said fusible element is interrupted when the current flow through said heating element exceeds a threshold value for a predetermined period of time, wherein, in order to produce connections to said heating element and said fusible element, a conductive layer is so applied to the substrate and structured that said heating element and said fusible element are connected in series, said heating element being arranged at a predetermined spacing beside said fusible element, and wherein, at least one predetermined location at said heating element and/or between said heating element and said fusible element, a predetermined local thermal capacity storing a portion of the heat propagating from said heating element to said fusible element is adjusted by adjusting the layout, the thickness and the material of the layer of said heating element and/or the layout, the thickness and the material of an additional thermal storage layer being arranged above or beneath said heating element and/or between said heating element and said fusible element and having a specific thermal capacity which is higher than that of said substrate, whereby, at least approximately, a defined time behaviour of the thermal transfer from said heating element to said fusible element is provided.

In the context of the invention, a protective component is to be understood not only as a fuse element with an electrical resistance which is generally low but also a safety resistor with predetermined electrical resistance. A layer component is to be understood as a component produced both with thin film technology (for instance vapour deposition, sputtering, deposition from the gas phase) and also with thick film technology (for instance by screen printing), whereby, depending on the technology used, the layer is structured during application (e.g. screen printing) or after application over the entire area, (e.g. by photolithographic techniques). The interruption of the current flow in the fusible element need not necessarily be based only on the material melting in the melting region and contracting as a result of surface tension and thereby forming a gap between the connections. Instead, a fusible element is generally used in which, as a result of the interaction, a layer containing a molten metal with an electrically conductive layer disposed beneath it dissolves the electrically conductive layer, for instance by the formation of an alloy, and is ruptured. The melting region is thus that region or that area of the layer component, at which the current flow is interrupted as a result of the melting of at least one component of the fusible element. The protective component can also have a plurality of heating elements arranged around the fusible element.

The current flow through the fusible element is interrupted when the current flow through the heating element exceeds a threshold value for a predetermined period of time. The currents do not need to be identical: any desired circuitry and/or mode of contact is possible. The predetermined period of time is associated with a respective threshold value of the current. There is thus an unlimited number of period of time/threshold value pairs, which together define a time-current characteristic of the protected component.

The invention is based on the fundamental recognition that the time behaviour or tripping behaviour (time-current characteristic) of the protective component depends crucially on the local thermal capacity at the location of the heating element and on the local thermal capacities disposed in the pathway of the thermal propagation from the heating element to the fusible element. In particular, the time-current characteristic for currents above the threshold value up to multiples of the threshold current (e.g. 10 times the threshold current) is determined by these thermal capacities. The basic concept of the manufacturing method in accordance with the invention based on this fundamental recognition is the targeted setting of the distance between the heating element and the fusible element and of the local thermal capacities at the location of the heating element or at a predetermined location between the heating element and the fusible element by targeted variation of the layout and the layer sequence of the component.

In one embodiment, a predetermined thermal conduction resistance is set approximately by the setting of a predetermined spacing between the heating element and the fusible element. In conjunction with the local thermal capacities set at the location of the heating element, a predetermined time constant of the thermal transfer from the heating element to the fusible element is produced.

The same applies to the arrangement of local thermal capacities at predetermined locations between the heating element and the fusible element. The distance from the heating element to the predetermined location of the local thermal capacity results in a predetermined thermal conduction resistance; a further thermal conduction resistance is produced from the distance of the predetermined location to the fusible element. A predetermined time constant may be set here also by adjusting the local thermal capacity. The time constant is approximately proportional to the product of an effective thermal conduction resistance, which increases with the distance from the heating element and fusible element, and the local thermal capacity. As a result of the targeted adjustment of one or more local thermal capacities at predetermined distances from the heating element and the fusible element, one or more time constants may be set in a targeted manner, which define the time behaviour of the thermal transfer and thus the time-current characteristic of the protective component.

In one embodiment of the method in accordance with the invention, the predetermined local capacity at the location of the heating element is set, with a predetermined substrate material and predetermined layer material and predetermined layer thickness of the heating element, by adjusting the area of the heating element. The area of the heating element determines the proportion of the volume of the substrate directly coupled to the heating element, that is to say the segment of the substrate that absorbs the heat produced by the heating element directly, that is to say without any substantial time delay. Further transport of the heat does of course take place in the substrate and this takes up time. This linking of thermal conduction and thermal storage in the substrate may, however, be modelled such that a thermal capacity is produced directly at the heating element, which is acted on by the heating power supplied to the heating element. This local thermal capacity is approximately proportional to the area of the heating element. In one embodiment, the area of the heating element can be adjusted by increasing or reducing the length and the breadth of a rectangular heating element by the same factor. The electrical resistance of the heating element contacted at the end faces thus remains substantially unaltered.

Alternatively, the area of the rectangular heating elements can be adjusted by merely altering its length. This results in a constant cross-sectional area for the current flow. With a serious connection of the fusible and heating elements, in which the heating element is so constructed that it responds to high currents before the fusible element and interrupts the current flow, and approximately constant tripping behaviour can be achieved at the high current.

In an alternative embodiment, the local thermal capacity at the location of the heating element is adjusted, with a predetermined substrate material and predetermined area of the heating element, by adjusting the layer thickness of the heating element and/or changing the material of the layer of the heating element. Additionally, with the constant area of the heating element, the ratio of its length to its breadth can be altered in order to maintain the electrical parameters constant with an altered layer. When manufacturing the heating element, a plurality of different types of resistive layers can be applied above one another, the thickness and materials of which are so selected that a predetermined local thermal capacity is produced. In this embodiment, the local thermal capacity (i.e. the ability to store heat) of the layer of the heating element is adjusted. The local thermal capacity (which is not adjusted in a targeted manner in this embodiment) of the substrate material at the heating element is of course in addition to this adjusted local thermal capacity of the heating element layer. In an alternative embodiment, the local thermal capacity at the location of the heating element is adjusted, with a predetermined substrate material and predetermined dimensioning of the heating element, by applying an additional thermal storage layer of predetermined thickness beneath the layer of the heating element, the specific thermal capacity of which differs from that of the substrate. Alternatively or additionally, a thermal storage layer with a predetermined specific thermal capacity and thickness can be applied above the layer of the heating element. A layer of a material with a high specific thermal capacity is preferably applied as the additional thermal storage layer, which results in an increased local thermal capacity at the location of the heating element and thus in a slower response of the protective component. If an electrically conductive element is used as the additional thermal storage layer, an electrical insulator layer is preferably applied between the thermal storage layer and the resistive layer of the heating element. In one embodiment, the additional thermal storage layer can also be applied over the entire area of the substrate (before the application of the fusible element).

In an alternative embodiment, in which the layer of the heating element is disposed at least partially beneath the fusible element, the distance between the heating element and the fusible element is adjusted by variation of the thickness of an electrically insulating layer disposed between them and the predetermined local thermal capacity at the location of the heating element is adjusted, with a predetermined substrate material, by adjusting the area, the layer thickness and the layer material of the heating element and/or the layer structure and the material of the electrically insulating layer applied above the heating element and/or by applying an additional thermal storage layer of predetermined thickness and predetermined specific thermal capacity beneath the layer of the heating element.

In the alternative method referred to above, in which a predetermined local thermal capacity is set at a predetermined location between the heating element and the fusible element, this local thermal capacity is preferably adjusted by applying an additional thermal storage layer to the at least one predetermined location with a predetermined area and predetermined thickness and with a material of a predetermined specific thermal capacity. The predetermined specific thermal capacity is preferably larger than that of the substrate material so that the set local thermal capacity is increased and results in a delayed response of the protective component. A more inert behaviour of the protective component may thus be set in a targeted manner. Alternatively, at the predetermined location, the specific thermal capacity of a predetermined region (volume) of the substrate can be altered.

Advantageous embodiments of the invention are characterised in the dependent claims.

BRIEF DESCRIPTION OF THE DRAWINGS

The invention will be described below with reference to preferred exemplary embodiments, which are illustrated in the drawings. In the drawings.

DETAILED DESCRIPTION

Figure 1:
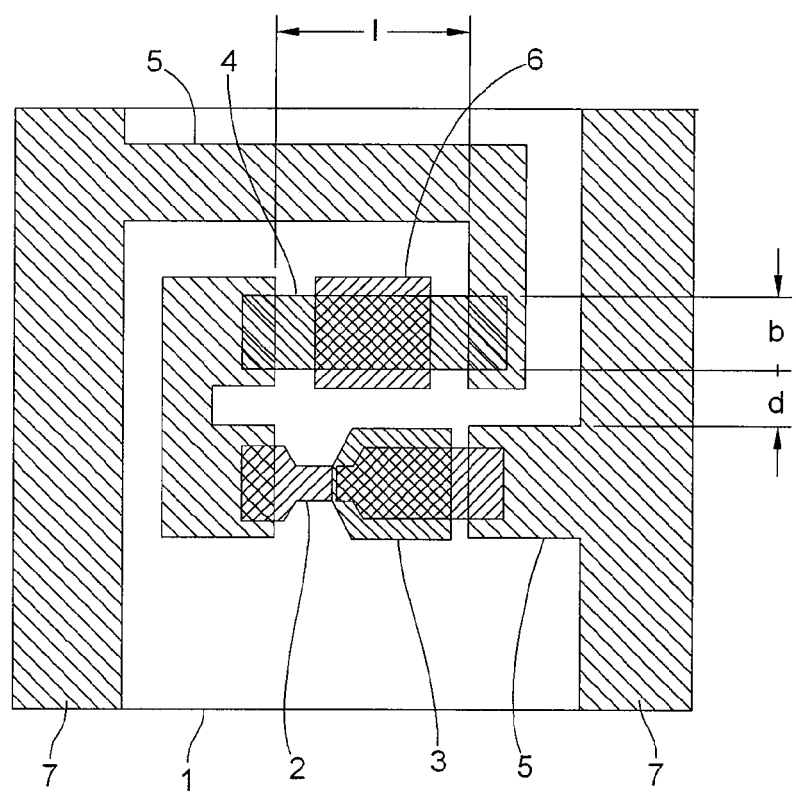
FIG. 1 is a diagrammatic view of the layout of a protective component manufactured by the method in accordance with the invention.

FIG. 1 is a diagrammatic view of the layout of an exemplary protective component. Applied to a substrate 1 with the aid of thin layer technology or thick layer technology is a plurality of layers which are structured so that they produce the series connection of a heating element and fusible element with associated contacts. The substrate 1 is preferably part of a larger substrate (for instance a wafer), on which a plurality of similar protective components are produced at the same time, whereby after completion of the layers of the protective components, the substrate is divided into the substrate chips 1. The substrate 1 preferably consists of an electrically insulating material; alternatively a multi-layer construction can also be used, the uppermost layer of which is electrically insulating. Aluminium oxide, for instance, can be considered as the substrate material. Alternatively, a glass ceramic, for instance, can be used, which has a significantly lower thermal conductivity by comparison with aluminium oxide but has a comparable thermal capacity.

Situated on the substrate illustrated in FIG. 1 is a fusible element, which consists of a conductive layer 2 resting on the substrate and a layer 3, which is applied above it and includes a low melting point metal. The conductive layer 2 consists, for instance, of silver and/or palladium and can be applied not only with thin layer technology but also with thick film technology, whereby its thickness is, for instance, about 1 µm. The layer containing the low melting point metal consists, for instance, of tin powder in an organic bonding agent. Alloys containing bismuth, lead and/or tin can also be used as the low melting point metals. A fusible partition layer, which separates the particles of the low melting point metal from the metal of the layer 2, can be provided between the relatively thin electrically conductive layer 2 and the layer 3, containing a low melting point metal, of the fusible element.

Also applied to the substrate 1 is a resistive layer 4, from which the heating element is formed. The resistive layer 4 consists of a material with a predetermined specific resistance. The opposite ends of the conductive layer 2 of the fusible element and the opposite ends of the resistive layer 4 are contacted with the aid of a conductive layer 5, applied above them, of a good electrically conductive metal. Ignoring the contact influences, approximately the following is produced for the electrical resistance R of the heating element:

$$R = \rho \cdot \frac{1}{b \cdot D_{Heat}}$$

whereby l is the length of the resistive layer 4 between the contacts to the conductive layer 5, b is the width of the strip of the resistive layer 4, $D_{Heat}$ is the thickness of the resistive layer 4 and ρ is the specific resistance of the resistive layer. When a current I thus flows through the heating element with the resistance R, power $P=I^2R$ is converted into heat in the resistor.

The resistive layer 4 is preferably so constructed that when the current I through the resistive layer exceeds a predetermined threshold value, the resistive layer itself is then so altered that the current flow is interrupted. This threshold value of the current is, however, considerably higher than that current at which the fusible element blows as a result of the heat produced and interrupts the current flow. This interruption function of the resistive layer can therefore only occur in the event of current spikes which are so brief that the heating of the fusible element is not sufficient in order to rupture it.

In the exemplary embodiment illustrated in FIG. 1, an additional thermal storage layer 6 is applied above or below the resistive layer 4. This can also be applied beneath the resistive layer 4 in an alternative exemplary embodiment. The thermal storage layer 6 preferably consists of a material of relatively high specific thermal capacity.

The construction of the contacts for connecting the protective component is not shown in more detail in FIG. 1. Merely contact surfaces 7 are shown in FIG. 1 on the opposite sides of the substrate 1, which are constituted by the conductive layer 5. A coating of a conductive material is preferably formed on the contact surfaces and also engaging around the edge of the substrate 1 and on the underside of the substrate 1, so that a component is formed which can be mounted on a circuit board by surface mounting (SMD component). The SMD component is secured at both of its ends, which have the contact surfaces 7, with the aid of a solder joint to the circuit board disposed beneath it.

The function of the protective component illustrated in FIG. 1 will be explained in more detail below. If a current is applied via the contact surfaces 7 to the series circuit of the heating element having a resistive layer 4 and the fusible element having the layers 2 and 3, a voltage drop occurs as a result of the electrical resistance of the layers which are used, both across the resistive layer 4 and also across the conductive layer 2 of the fusible element and across the supply lines of the conductive layer 5. As a result of the voltage drop, electric power $P=U \times I$ is converted into heat in the circuit elements. The material and the thickness of the conductive layer 5 are so selected that there is only a very small voltage drop across these conductive paths. The layers of the fusible element and of the resistive heating element are preferably so formed that the resistance of the heating element is at least an order of magnitude greater than that of the fusible element, so that the major proportion of the power converted in the protective component occurs across the resistive layer 4 of the heating element. A heat output $P_{th}$ proportional to the square of the current I is thus produced in the resistive layer 4 of the heating element.

If a current I of predetermined magnitude is suddenly applied (that means an increase from zero to I within a very short period of time), the power supplied $P_{th}$ results initially in heating of the resistive layer 4 itself. The uniformity of the heating of the resistive layer depends on the current density distribution of the current flow within this layer. The heat produced in the resistive layer 4 is then transported by means of thermal conduction to the layers situated beneath it, situated above it and/or adjoining it; in the absence of the thermal storage layer 6, the largest proportion of the heat produced in the resistive layer 4 is dissipated by means of thermal conduction into the substrate material situated beneath it. The immediately adjacent substrate layers heat up first. The heat subsequently penetrates deeper into the substrate and propagates laterally, whereby the speed of the heat propagation is dependent not only on the thermal conductivity of the material but also on its specific thermal capacity. If an additional thermal storage layer 6 is arranged above the resistive layer 4, a proportion of the heat produced in the resistive layer 4 is dissipated into it until the thermal storage layer 6 has heated up to the temperature of the resistive layer. A proportion of the heat produced in the resistive layer is transferred via the contacts to the conductive layer 5 of the supply lines. A further proportion of the heat is of course lost to the environment by thermal conduction, thermal radiation and/or convection.

A proportion of the heat propagating within the substrate 1 gets to the substrate region beneath the layers 2 and 3 of the fusible element. Starting from the substrate 1, the layers 2 and 3 of the fusible element are then heated.

After a period of time, which is dependent on the layout of the layers used, the thicknesses of the layers and the materials used and of the material of the substrate 1, a stationary condition of the temperature distribution on the protective component has been established after the sudden application of the current I (it is of course presupposed in this connection that the environmental conditions remain constant). The transient behaviour until the stationary state of the temperature distribution is reached corresponds to that of a (possibly multi-element) low pass filter (in electrical analogue terms), whereby one or more time constants can be associated with the transient behaviour.

In the method in accordance with the invention, these time constants are set in a targeted manner by appropriate dimensioning of the layout and of the layers.

Figure 2A:
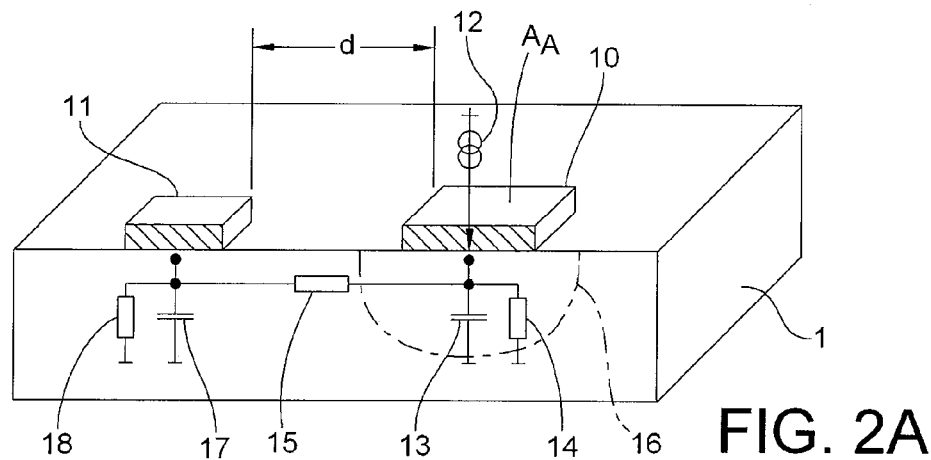
FIGS. 2A and 2B are diagrammatic views of the arrangement of the heating element and fusible element on the substrate with a simplified thermal equivalent circuit diagram with changing area of the heating element.
Figure 2B:
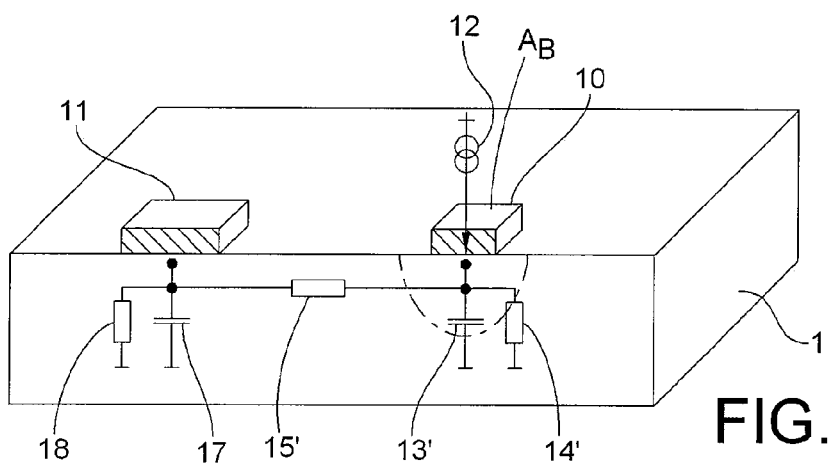

In FIGS. 2A and 2B, the arrangements of a heating element 10 and a fusible element 11 on a substrate 1 together with a substantially simplified thermal equivalent circuit diagram, which illustrates the thermal coupling of the two elements via the substrate 1, are shown schematically. As mentioned above, the flowing of a current I through the heating element 10 with the resistance R results in the production of thermal power $P_{th}$ within the heating element 10. The power supplied can be illustrated in the thermal equivalent circuit diagram by a current source 12. The heating power $P_{th}$ supplied to the heating element 10 results in heating of the heating element 10 itself and directly in heating of the substrate segment located beneath the heating element. The supply of heat is distributed approximately uniformly over the area of the heating element 10 (provided that the current density of the current flowing through the heating element 10 is also distributed uniformly). If heating power is suddenly produced in the heating element 10, the uppermost layers of the substrate 1 are firstly heated and then the layers beneath it and the laterally adjoining layers of the substrate by propagation of the heat. This linkage of conduction and heat storage can be reproduced in simplified form in a model by a thermal capacity 13 with a thermal resistance connected in parallel and (if the thermal conduction is to be viewed only in the direction of the fusible element) a further thermal resistance 15. The thermal capacity 13 of the substrate segment acted on by the supply of heat corresponds, for instance, to a volume region 16, which is illustrated in FIG. 2A by a chain line 16. The thermal capacity 13 shown in the model thus embodies the thermal capacity of the layer of the heating element 10 itself plus the thermal capacity of the effective substrate segment 16. The thermal properties of the fusible element 11 can again be simulated by a thermal capacity 17 and a thermal resistance 18 arranged in parallel. The magnitude of the thermal resistance 15 for the thermal conduction between the heating element 10 and the fusible element 11 is determined, amongst other things, by the distance d between the heating element 10 and the fusible element 11. It is clear from the illustrated thermal equivalent diagram that the time constants of the thermal transfer from the heating element 10 to the fusible element 11 and thus the time dependence of the response of the fusible element as a result of its heating is determined primarily by the local thermal capacity 13 at the heating element 10, thermal resistance 15 and the local thermal capacity 17 of the fusible element 11. These magnitudes are heavily dependent on the sizing of the layout and the layer thicknesses and on the selection of the materials. The thermal resistance 15 is strongly influenced by the distance d between the heating element 10 and fusible element 11 and the thermal capacity 13 of the area $A_A$ of the heating element 10. The influencing of the thermal capacity 13 by adjusting the area A of the heating element 10 is illustrated in FIGS. 2A and 2B. In FIG. 2B, the area $A_B$ of the heating element 10 is reduced. The distance d between the heating element 10 and fusible element 11 is maintained approximately constant. This results in a significantly smaller thermal capacity 13' with a slightly altered thermal resistance 15', which results in a significantly smaller time constant. With dimensions which are otherwise the same, electrical parameters which are the same and supplied heating power 12 which is the same, the protective component shown diagrammatically in FIG. 2B exhibits a more rapid response with respect to that shown in FIG. 2A, which means a more strongly flattened time-current characteristic at multiples of the threshold current.

Figure 3:
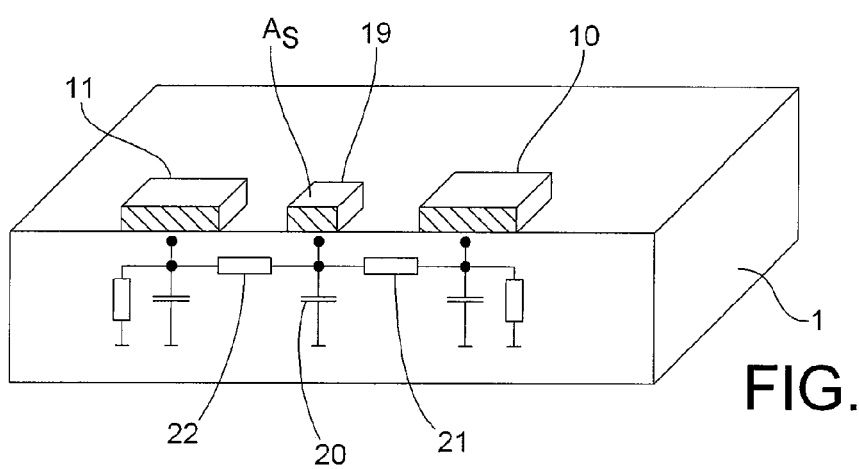
FIG. 3 is a diagrammatic view of the protective component with the heating element applied to the substrate and the fusible element and an additional local thermal capacity disposed between them and an associated thermal equivalent circuit diagram.

FIG. 3 shows an alternative possibility for adjusting the time constants of the response of the protective component. In the protective component shown diagrammatically in FIG. 3 an additional thermal store in the form of a structured thermal storage layer 19 is applied to the surface of the substrate 1 between the heating element 10 and the fusible element 11. In the thermal equivalent circuit diagram, this thermal storage layer 19 is represented by the capacity 20, the thermal conduction resistance between the heating element 10 and the fusible element 11 being divided into the two resistances 21 and 22. The thermal storage layer 19 creates an additional delay to the propagation of heat from the heating element 10 to the fusible element 11 and thus a slower response of the protective component. The local thermal capacity 20 of the thermal storage layer 19 is adjusted by the area $A_s$ of the storage layer and the thickness thereof and by the selection of materials (specific thermal capacity).

Numerous alternative embodiments are possible within the scope of the inventive concept. Instead of a rectangularly structured resistive layer 4 of the heating element 10, a plurality of heating elements of any desired shape can be used. The heating elements can, for instance, be arranged around the fusible element 11. Instead of one fusible element, a plurality of fusible elements with different responses can also be arranged at different distances from the heating element. The heating element and fusible element do not need to be connected in series. They can be associated with separate external contacts, whereby the external contacts can be connected into different circuits.

If the protective component is to be used as a fuse component, the circuit connection of the heating element and fusible element is preferably so dimensioned that a low electrical resistance is produced. The electrical resistance of the heating element must of course be sufficiently large that the necessary heat energy can be supplied to the substrate. The necessary heat energy can be minimised if the fusible element is moved closer to the heating element or is even arranged above it and if a substrate is used with a low thermal conductivity. In order nevertheless to ensure a sufficient inertia, a substrate material can be used with a high thermal capacity or an additional thermal storage layer can be applied beneath the heating element. In the fuse component, which basically produces as little thermal energy as possible, the substrate material with poor thermal conductivity would additionally have the advantage that the heating of the substrate, particularly the temporary heating of the substrate, remains limited locally to the region around the heating element and the fusible element (hot spot). This results in less heating of the externally arranged connections and the solder connection engaging the connections and thus reduces the risk of spontaneous "burning out" of the component.

Alternatively, the protective component can be constructed in the form of a safety resistance, that is to say in the form of a protective component with a predetermined electrical resistance, which is as constant as possible. In this case, the series connection of the heating element and fusible element is preferably so dimensioned that the overall resistance of the component is predominantly determined by the electrical resistance of the heating element. The necessary result of the predetermined electrical resistance of the heating element is a higher power consumption by comparison with the fuse components. This higher power loss results in stronger heating of the component. In this event, only a smaller proportion of the heat produced is required for transmission to the fusible element. Another proportion of the heat is to be dissipated via the substrate to the surroundings. In this event, a substrate material with good thermal conduction would be chosen. This more thermally conductive substrate material naturally results in reduced time constants due to the more rapid dissipation of the heat. In order nevertheless to achieve an inert behaviour of the protective component, an increased local thermal capacity is used, in accordance with the invention, at the heating element (for instance by a large area of the heating element or by special material layers beneath and/or above the heating element). The time characteristic of the thermal transfer from the heating element to the fusible element is further determined by the layout arrangement, that is to say the arrangement of the heating element with respect to the fusible element.

The invention claimed is:

1. A method of providing a protective component comprising a fusible element having terminals, and a heating element, which are applied in the form of layer components to the surface of a substrate, said fusible element being configured so that a current flow between its terminals is interrupted if the fusible element is heated, at least in a melting region, for a predetermined period of time above a predetermined temperature, said fusible element and said heating element being so arranged on the substrate that heat produced by said heating element is transported to said fusible element, and a current flow through said fusible element is interrupted when the current flow through said heating element exceeds a threshold value for a predetermined period of time, wherein, in order to produce connections to said heating element and said fusible element, a conductive layer is so applied to the substrate and structured that said heating element and said fusible element are connected in series, said heating element being arranged at a predetermined spacing beside said fusible element, and wherein, at least one predetermined location at said heating element and/or between said heating element and said fusible element, a predetermined local thermal capacity storing a portion of the heat propagating from said heating element to said fusible element is adjusted by adjusting at least one of:

(1) the layout, the thickness and the material of the layer of said heating element,
(2) the layout, the thickness and the material of an additional thermal storage layer being arranged above or beneath said heating element, said additional thermal storage layer having a specific thermal capacity which is higher than that of said substrate,
(3) the layout, the thickness and the material of an additional thermal storage layer being arranged between said heating element and said fusible element, said additional thermal storage layer having a specific thermal capacity which is higher than that of said substrate, whereby, at least approximately, a defined time behaviour of the thermal transfer from said heating element to said fusible element is provided;

wherein said predetermined local thermal capacity at the location of said heating element is adjusted, with a predetermined dimensioning of said heating element, by applying said additional thermal storage layer above or below the layer of said heating element; and wherein said additional thermal storage layer is electrically conductive and an electrical insulator layer is applied between said thermal storage layer and the layer of said heating element.

2. The method as claimed in claim 1, wherein said predetermined local thermal capacity at the location of said heating element is adjusted, with predetermined layer material and predetermined layer thickness of said heating element, by adjusting the area of said heating element.

3. The method as claimed in claim 2, wherein a rectangular heating element is formed and the area of said heating element is adjusted by increasing or reducing the length and the width of said heating element by the same factor.

4. The method as claimed in claim 2, wherein a rectangular heating element is formed and the area of said heating element is adjusted by altering only its length, whereby a constant cross-sectional area is provided for the current flow.

5. The method as claimed in claim 1, wherein said predetermined local thermal capacity at the location of said heating element is adjusted, with predetermined area of said heating element, by adjusting the layer thickness of said heating element and/or altering the material of the layer of said heating element.

6. The method as claimed in claim 5, wherein, with constant area of said heating element, the ratio of its length to its width is altered.

7. The method as claimed in claim 5, wherein, in order to produce said heating element, a plurality of different resistive layers are applied above one another, the thicknesses and materials of which are so selected that a predetermined local thermal capacity is produced.

8. The method as claimed in claim 1, wherein said additional thermal storage layer is applied over the entire area of said substrate.

9. The method as claimed in claim 1, wherein said predetermined local thermal capacity is adjusted by applying said additional thermal storage layer at least at one predetermined location between said heating element and said fusible element.

10. The method as claimed in claims 1, wherein said fusible element is produced by firstly applying an electrically conductive layer and applying, over at least a portion of the area of the electrically conductive layer, a low melting point metal layer, wherein, when it melts, the low melting point metal can form an alloy with the material of the electrically conductive layer so that it is melted, at least in the melting region, so that a current flow through the electrically conductive layer is interrupted.

11. The method as claimed in claim 1, wherein said protective component is a fuse component and the substrate of a material of low thermal conductivity is used, said substrate having a high specific thermal capacity, at least in the region beneath and between said heating element and said fusible element.

12. The method as claimed in claim 11, wherein a glass ceramic is used as the substrate material.

13. The method as claimed in claim 11, wherein said fuse component is constructed in the form of an SMD component.

14. The method as claimed in claim 1, wherein said protective component is a safety resistor (RCP), the substrate of a good thermally conducting material is provided and the heating element is so dimensioned that it has a predetermined electrical resistance between its connections.

15. The method as claimed in claim 14, wherein the layer of said heating element and the layer of said fusible element are so constructed that the electrical resistance of said heating element is substantially larger than that of said fusible element, and said heating element and said fusible element are electrically connected in series so that the electrical properties of the safety resistor are substantially determined by those of said heating element.

\* \* \* \* \*